(12) United States Patent
Barr et al.

(10) Patent No.: US 7,577,949 B2
(45) Date of Patent: Aug. 18, 2009

(54) INSTALLATION SOURCE MANAGEMENT

(75) Inventors: Paul C. Barr, Redmond, WA (US); Scott E. Kurtzeborn, Redmond, WA (US); Terri V. Cheff-Goldade, Milltown, MT (US)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 11/039,313

(22) Filed: Jan. 20, 2005

(65) Prior Publication Data
US 2006/0161915 A1 Jul. 20, 2006

(51) Int. Cl.
*G06F 9/44* (2006.01)

(52) U.S. Cl. ............... 717/169; 717/168; 717/170; 717/174

(58) Field of Classification Search ......... 717/168–177; 711/123–146
See application file for complete search history.

(56) References Cited

U.S. PATENT DOCUMENTS

| | | | | |
|---|---|---|---|---|
| 6,073,214 | A * | 6/2000 | Fawcett | 711/133 |
| 6,327,705 | B1 * | 12/2001 | Larsson et al. | 717/174 |
| 6,438,743 | B1 * | 8/2002 | Boehm et al. | 717/122 |
| 6,591,418 | B2 * | 7/2003 | Bryan et al. | 717/177 |
| 6,631,449 | B1 * | 10/2003 | Borrill | 711/141 |
| 6,959,320 | B2 * | 10/2005 | Shah et al. | 709/203 |
| 7,003,767 | B2 * | 2/2006 | Larkin | 717/172 |
| 2002/0035674 | A1 * | 3/2002 | Vetrivelkumaran et al. | 711/130 |
| 2002/0100038 | A1 * | 7/2002 | Balassanian | 717/177 |
| 2002/0188942 | A1 * | 12/2002 | Bryan et al. | 717/176 |
| 2003/0217227 | A1 * | 11/2003 | Parthasarathy et al. | 711/118 |
| 2004/0015953 | A1 * | 1/2004 | Vincent | 717/173 |
| 2005/0144610 | A1 * | 6/2005 | Zenz | 717/168 |
| 2007/0089110 | A1 * | 4/2007 | Li | 717/178 |

* cited by examiner

*Primary Examiner*—Wei Y Zhen
*Assistant Examiner*—Matthew J Brophy
(74) *Attorney, Agent, or Firm*—Lee & Hayes, PLLC (57) ABSTRACT

Described herein are one or more implementations for facilitating the installation and/or maintenance of software products from a cached software-installation source. With at least one implementation, an installation-source manager loads installation-source components of an already-installed software product into an installation-source cache of a computer. The manager then enables the loaded installation-source components in the installation-source cache so that the computer is configured to acquire installation source components of the already-installed product from the loaded installation-source components in the installation-source cache. The manager does these things without re-installing the already-installed software product. With at least one implementation, an enterprise installation-source manager obtains installation-source components of a software product. The manger then loads, over a computer communications network, the obtained the installation-source components into an installation-source cache of each of multiple network-coupled computers.

11 Claims, 5 Drawing Sheets

INSTALLATION SOURCE MANAGEMENT

TECHNICAL FIELD

This invention generally relates to a technology for managing the installation source for software products.

BACKGROUND

A "software product" is typically installed on a computing system via portable computer-readable media (e.g., a CD-ROM, DVD-ROM, floppy disk, etc.) or via a computer communications network (e.g., a Local Area Network (LAN), Wide Area Network (WAN), Internet, intranet, extranet, point-to-point communications, etc.).

A software product is typically manifested by a bundle that includes installation databases and installation programs on one or more computer-readable media (portable media or via a network) for installation on a computing system. This installation manifestation is bundled so that it provides for installation of the software product on to the computing system from that product's installation media.

For example, the Microsoft® Word® word-processing product is a software product (more specifically, it is an application). The installation bundle for this particular product consists of an installation program and one or more installation databases.

In this example, the installation program is the Microsoft® Windows® Installer software-installation product. The Windows® Installer manages the installation of software products (e.g., the Microsoft® Word® word-processing product) and/or removal, updating, and/or modification of already-installed software products by applying a set of centrally defined setup rules during the installation process. These setup rules define the installation and configuration of the installed application.

The installation database for this particular product is used to hold information regarding the setup and installation of this particular product. That includes the aforementioned setup rules. The installation database is composed of so-called "MSI files." Thus, the installation is loosely called a "MSI database" and the Windows® Installer is often loosely called a "MSI installer."

Once installed, the software product has a manifestation that allows it to be functional and/or useful on the computer. Generally, examples of functional and/or useful manifestations of software products are applications, operating systems, drivers, etc.

In a small-scale network, it is common for a network administrator ("net-admin") to personally visit each physical computer on the network when installing new software products or upgrading already installed products. At each computer, the net-admin or the user typically installs a software product into the computing system from an original installation source (i.e., original installation bundle). The original installation source is typically found on a removable computer-readable media (e.g., CD-ROM or DVD-ROM) or on a network-accessible share-point on a communications network.

In addition to the installation, subsequent updates or repairs to the installed software product may again require access to the original installation source. Unfortunately, the original installation source is not always readily available. A user or net-admin may have, for example, not kept the original CD-ROM or not kept the download authorization for the original download source. More simply, a user or net-admin may have simply forgotten (or never knew) the location of the original installation source.

SUMMARY

Described herein are one or more implementations for facilitating the installation and/or maintenance of software products from a cached software-installation source.

With at least one implementation, an installation-source manager loads installation-source components of an already-installed software product into an installation-source cache of a computer. The manager then enables the loaded installation-source components in the installation-source cache so that the computer is configured to acquire installation source components of the already-installed product from the loaded installation-source components in the installation-source cache. The manager does these things without re-installing the already-installed software product.

With at least one implementation, an enterprise installation-source manager obtains installation-source components of a software product. The manger then loads, over a computer communications network, the obtained the installation-source components into an installation-source cache of each of multiple network-coupled computers.

DESCRIPTION OF THE DRAWINGS

The same numbers are used throughout the drawings to reference like elements and features.

DETAILED DESCRIPTION

The following description sets forth techniques facilitating the installation and/or maintenance of software products from a cached software-installation source. Using these techniques, an installation-source cache for a software product is managed by, for example, pre-loading the cache, restoring the cache, enabling the cache, fixating the cache, relocating the cache, disabling the cache, and removing the cache.

Installation-Source Cache

When users install a software product (e.g., Microsoft® Office 2003 suite of business productivity products) from an original source (e.g., a CD-ROM or an installation share-point on the communications network), the software installation program uses a specific system service to copy the required installation files (e.g., installation database) to a folder on the user's local computer. This folder is often hidden, secure, and compressed.

For at least one of the implementations described herein, this folder is specifically called the "local installation source" (LIS) cache. However, more generically, it may be called an installation-source cache. While the installation-source cache may be located on a computer's local storage device (e.g., a hard drive), it may also be located on any storage device that the computer may access. For example, the cache may be located on a network-accessible share-point.

Rather than use the original source (e.g., the CD-ROM), the software installation program (e.g., MSI Installer) uses this installation-source cache to install the software product. The installation-source cache remains on the local computer for later use. With this installation-source cache, users need not find nor need to remember how to access the original source when later performing maintenance (e.g., reinstalling, upgrading and repairing) on the already-installed software product. That is because the installation-source cache remains available on the local computer. Furthermore, with this installation-source cache, new features of a software product may be installed without the user needing to know the source location.

Retention of installation-source components (e.g., files containing the installation programs, data, and databases) for a software product in the installation-source cache offers a number of benefits to users. For example, those benefits include:

Traveling users, or users with slow or intermittent network connections, can install features on-demand or run the installation program in a maintenance mode to add new features without requiring a source on the network or in-hand.

When the installed software product is updated, administrators can distribute smaller client patches and users can apply them even when they do not have access to the original source.

Because the installation-source components (e.g., files) are significantly compressed in the installation-source cache, the installation-source cache requires considerably less storage (e.g., hard disk) space than a simple copy of the entire uncompressed installation image for that software product.

One or more implementations that create and/or utilize the installation-source cache are described in co-pending and co-owed U.S. patent application Ser. No. 10/687,730, titled "Source Engine for Transferring a Resource to Local Secure Cache," filed on Oct. 16, 2003.

While the software installation program (e.g., "setup" program) may create, by default, the installation-source cache for a software product, there are instances where the installation-source cache is either not created or not retained after initial installation.

If there is insufficient storage (e.g., hard disk) space available on the local computer (or target storage device) to store installation-source components, no installation-source cache is created. Furthermore, when the user selects an option during installation to remove the installation-source cache, the cache is automatically removed after installation. Moreover, the user or a storage "clean-up" utility may remove the installation-source cache. This removal is often done with the user knowing the consequences of such action.

Obviously, removal of the installation-source cache thwarts the benefits and purposes of the installation-source cache. One implementation of the exemplary installation-source manager provides a toolset that operate on the installation-source cache. One of the major functions provided by this toolset is recreation of a missing installation-source cache for a software product. There are, of course, other functions of the toolset.

Exemplary Environment for Management of Installation-Source Cache

Figure 1:
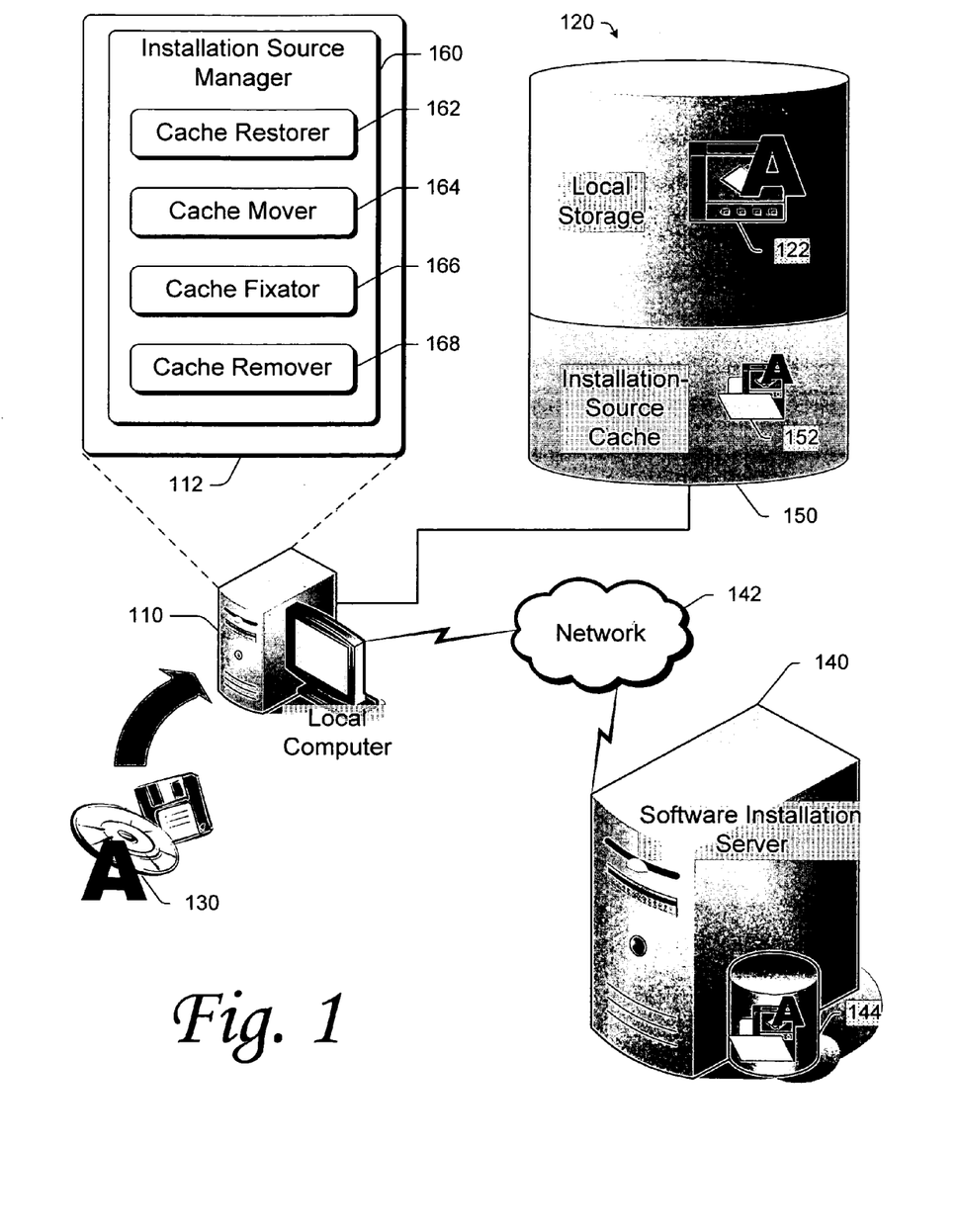
FIG. 1 shows an operational scenario in accordance with at least one implementation described herein.
Figure 5:
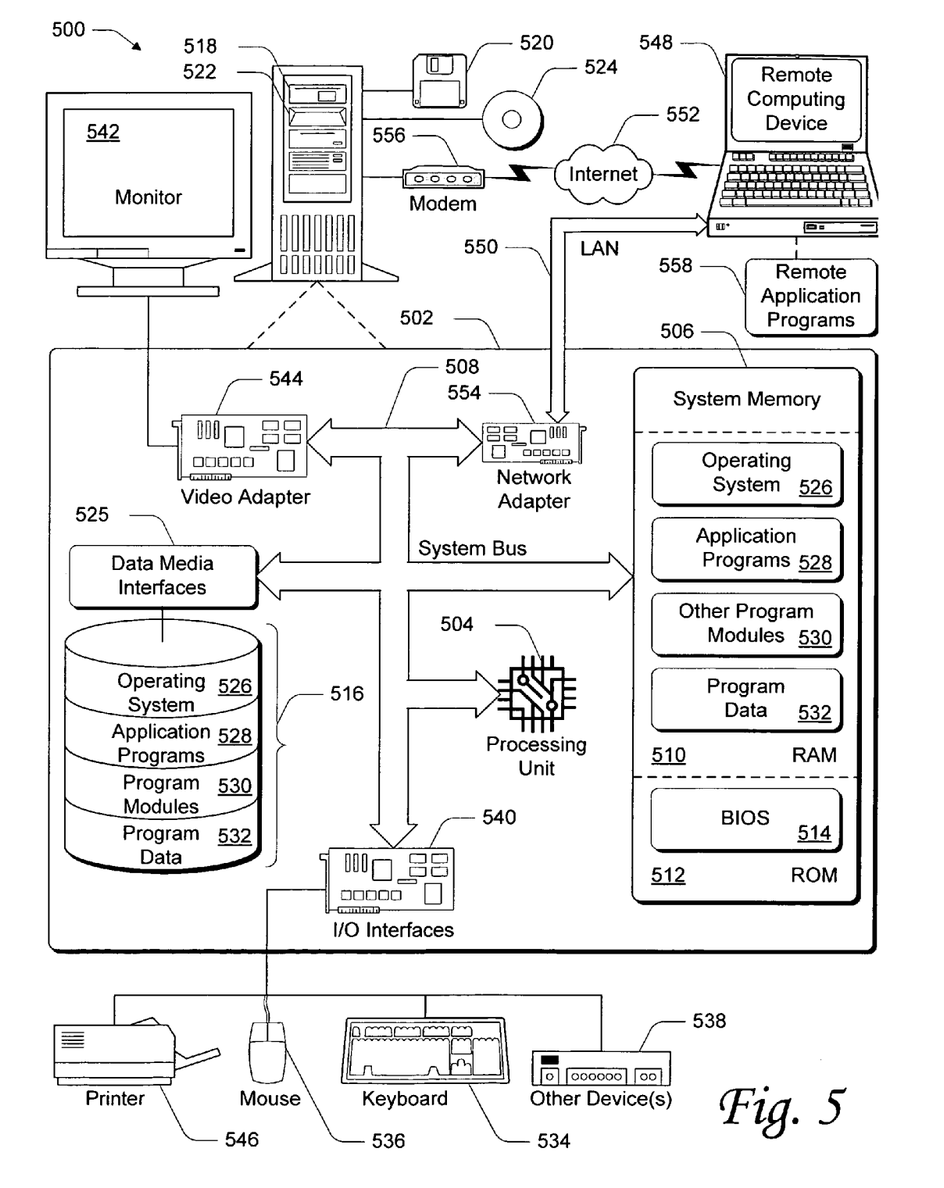
FIG. 5 is an example of a computing operating environment capable of (wholly or partially) implementing at least one embodiment described herein.

FIG. 1 illustrates an implementation of the exemplary installation-source manager, as described herein, that manages the installation-source files and the installation configuration of software products using one or more installation-source caches. The manager itself is, for example, a program module executing on a computer system (such as is depicted in FIGS. 1 and 5) that offers a toolset that operate on the installation-source caches of software products.

FIG. 1 shows a computer 110 which includes a memory 112 and a local storage system 120. At some past time, an application "A" 122 was installed onto the local storage system 120. When that installation occurred, the user of the computer 110 installed the application "A" 122 from an original source ("installation bundle"). That source may have been, for example, a removable storage media 130 (e.g., CD-ROM or floppy diskette). Alternatively, that source may have been located on a software installation sever 140 which is accessed via a communications network 142. As depicted, the network source is a network-accessible installation share-point 144.

During installation of application "A" 122, the installation program created an installation-source cache 150 on the local storage system 120. This installation-source cache 150 contains installation-source components 152. These components are used for the installation of the software product and were copied or loaded from an original installation source ("installation bundle") for that software product. The installation-source components 152 include programs, data, configuration, and databases used for the installation of the software product. For example, source components 152 include MSI installer (e.g., "setup.exe") and MSI databases (which include "CAB" files).

The example depicted in FIG. 1 shows a computer and its relationship to local storage on that computer. However, those of ordinary skill in the art understand that, unless the context indicates otherwise, the installation-source cache 150 may exist on any readily accessible storage component or service. Examples of other locations for the installation-source cache 150 include (but are not limited to) external hard drives, flash memory, solid-state media, optical disc media, most any non-removable media, most any removable media, network-accessible storage, and the like.

Exemplary Installation-Source Manager

As depicted in FIG. 1, an installation-source manager 160 program module executes in the memory 112 of the computer 110. The installation-source manager 160 is one implementation of the exemplary installation-source manager, which is described herein.

The installation-source manager 160 manages the installation-source cache 150 of one or more software products. The manager includes one or more of the following functional sub-modules: A cache restorer 162, a cache mover 164, a cache fixator 166, and a cache remover 168.

Cache Restorer: The cache restorer 162 restores or re-creates an installation-source cache for a software product from its original source or from an alternative source. As stated earlier, the benefits of the installation-source cache are thwarted when the contents of the cache are purposefully, inadvertently, or unwittingly cleared or removed.

Conventionally, one way to restore the installation-source cache for a software product is to re-install the product again. To do that, the user initiates a re-install of the already-installed product by invoking the installation program (e.g., MSI installer) of the installation bundle of the software product. Sometimes, a product will not re-install without the already-installed product being removed from the computer. In that situation, the user is forced to uninstall a presumably functional and already-installed software-product and then immediately install the product again.

Instead of this cumbersome conventional re-installation approach, the cache restorer 162 provides a new approach to restoring or re-creating an installation-source cache for a software product. The cache restorer 162 creates an installation-source cache (e.g., cache 150) and loads the installation-source components 152 of a particular software product into the cache. The restorer does this without re-installing the particular software product. Now, the already-installed application 122 will behave as though its original installation source is located in the installation-source cache 150.

In addition to restoration, the cache restorer 162 "enables" or "activates" an already-existing and already-accessible installation-source cache. This cache is an identified and usable installation-source cache with installation-source components for a specific software product. Sometimes a cache may be accessible on a local storage device (e.g., a hard drive) or on a network-accessible storage device, but the computer on which the software product is installed is not configured so that knows the location of this cache. Although the cache is readily accessible, the computer fails to find the installation-source components for a software product when those components are needed. This can happen when source list information gets corrupted or over-written.

Conventionally, one way to enable or activate an already-existing and already-accessible installation-source cache is to re-install the product again. The cumbersome nature of the conventional re-installation approach is discussed above.

Instead of that, the cache restorer 162 provides a new approach to enable or activate an already-existing and already-accessible installation-source cache. Via modifications to associated configuration data, the cache restorer 162 enables a software product's installation-source components in an already-existing and already-accessible installation-source cache. For example, the restorer may update centralized configuration files (e.g., the "registry") of the computer's operating system. Once "enabled," the computer acquires installation source components of the already-installed product from the now-enabled installation-source components in the installation-source cache.

Furthermore, the cache restorer 162 repairs an already-existing and already-accessible installation-source cache. Sometimes, the installation-source components of a cache are damaged via, for example, data corruption (as might happen in the event part of the disc goes bad) and malicious attack.

Conventionally, one way to repair an already-existing and already-accessible installation-source cache is to re-install the product again. Again, this conventional re-installation approach is cumbersome and is discussed above.

Instead wholesale re-installation, the cache restorer 162 provides a new approach to repairing an already-existing and already-accessible installation-source cache. Without a re-installation of a particular software product, the cache restorer 162 reloads the cache with a pristine set of installation-source components for the product. Alternatively, the restorer may identify the components that are damaged and reload only those components. The restorer performs its repairs without re-installing the software product.

Cache Mover: The cache mover 164 relocates an already-existing and already-accessible installation-source cache. The need or desire to relocate a cache may arise, for example, when an installation-source cache is consuming a significant portion of the available storage of a computer's primary internal storage system (e.g., hard drive) and a new cavernous external storage system has just been added to the computer. The user or net-admin may want to move the installation-source to this new external storage system to free up space on the primary storage system.

Using conventional approaches, the user could not effectively move the installation-source cache. Even if she was successful in manually moving the "bits" of the cache, the configuration data remained old and without update. Thus, the manually relocated cache was useless because the configuration data did not identify its new location.

Conventionally, the only effective approach to move an already-existing and already-accessible installation-source cache involves an un-install of the particular software product and then a re-install of that product. During re-installation, the user or net-admin may select a different location. While the apparent effect of these actions is a relocation of the cache, the actual action, in reality, is removal of an old cache and placement of a new (and presumably identical) cache in a different location than the old.

Instead of this cumbersome conventional un-installation/re-installation approach, the cache mover 164 provides a new approach to moving an installation-source cache for a software product. Via a user interface (UI), the user or net-admin specifies which installation-source cache(s) to move (assuming that there is more than one) and where to move it. In response, the cache mover 164 moves the selected cache to the new storage location and the mover modifies the associated configuration data (e.g., such may be found in the "registry") as necessary.

Cache Fixator: The cache fixator 166 fixates an already-existing and already-accessible installation-source cache. As stated earlier, the benefits of the installation-source cache are thwarted when the contents of the cache are purposefully, inadvertently, or unwittingly cleared or removed.

Once operated on by the cache fixator 166, a cache is characterized as "undeletable" because the cache cannot be changed, altered, cleared, deleted, or modified by user, application, program, or service that is not specifically authorized to do so. In this way, the fixator furthers the beneficial purpose of the installation-source cache by preventing purposefully, inadvertently, or unwittingly clearing, deletion, or modification of the installation-source cache.

However, since changes are inevitable, allowances are made for exceptions to the security provided by the cache fixator 166. Those exceptions may include those authorized by the net-admin or by a user with one of the highest security clearance on a particular computer. In addition, other operations of the installation-source manager 160 may qualify as an exception, especially if the net-admin overrides the security setting of the fixator.

Cache Remover: The cache remover 168 removes an already-existing and already-accessible installation-source cache. The need or desire to remove a cache may arise, for example, when an installation-source cache is consuming a significant portion of the available storage of a computer's primary internal storage system (e.g., hard drive).

Using conventional approaches, the user could not effectively remove the installation-source cache. Even if she was successful in manually removing the "bits" of the cache, the configuration data remained old and without update. Thus, an error occurred when there was an attempt to access the now-missing cache.

The cache remover 168 provides a new approach to removing an installation-source cache for a software product. Via a user interface (UI), the user or net-admin specifies which installation-source cache(s) to remove (assuming that there is more than one). In response, the cache remover 168 removes the selected cache and the remover modifies the associated configuration data (e.g., such may be found in the "registry") as necessary. Instead of removing the entire cache, the cache remover 168 may remove some of the installation-source components in the installation-source cache.

Furthermore, the cache remover 168 may disable an already-existing and already-accessible installation-source cache. Once a cache is disabled, the computer will no longer look towards that disabled cache for a software product's installation-source component. Via modifications to associated configuration data, the cache remover 168 disables a software product's installation-source components in an already-existing and already-accessible installation-source cache. For example, the restorer may update centralized configuration files (e.g., the "registry") of the computer's operating system.

When the cache remover 168 removes a cache, it will typically disable the cache as well.

Methodological Implementation

Figure 2:
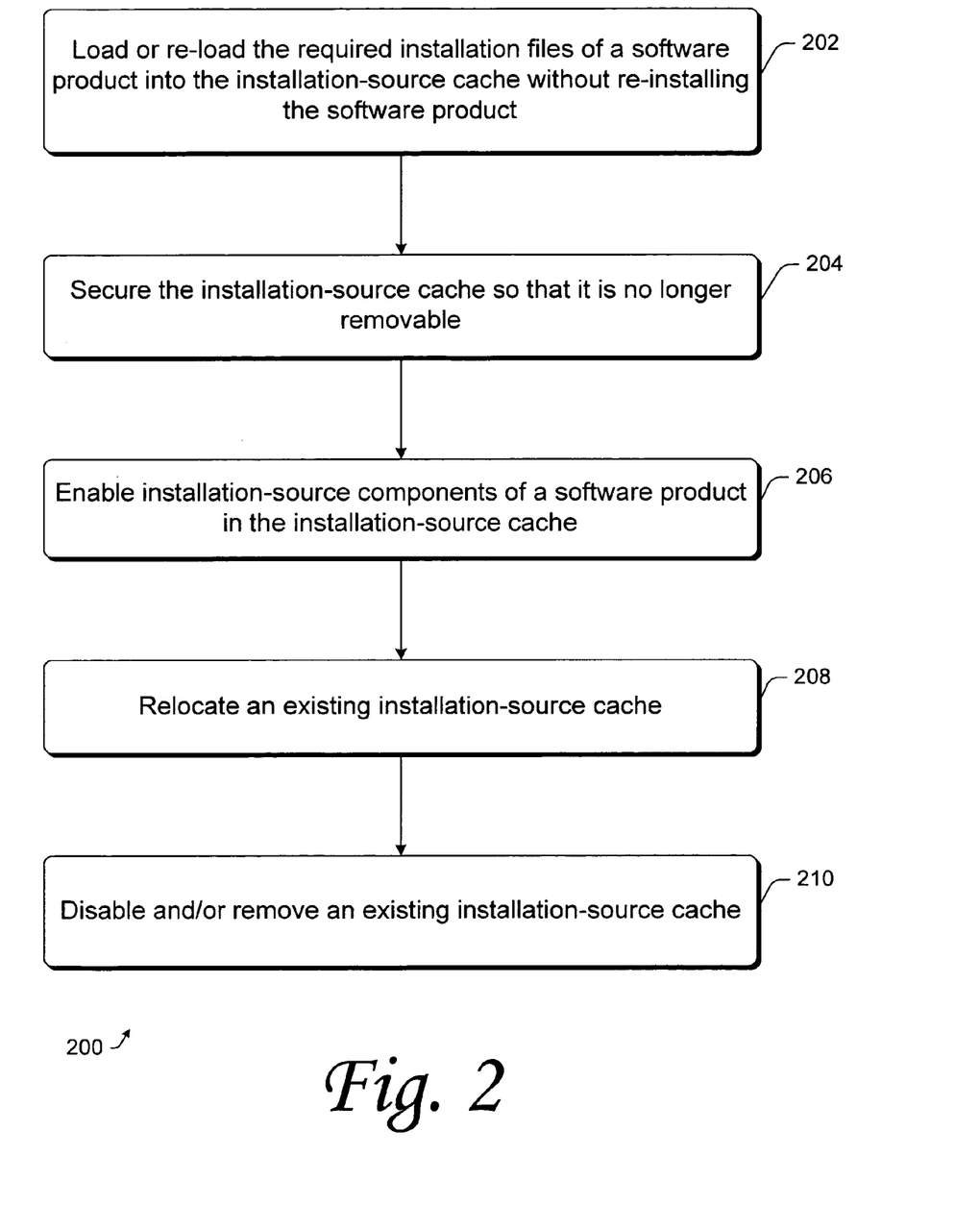
FIG. 2 illustrates a flow diagram showing a methodological implementation described herein.

FIG. 2 shows a method 200 performed by the installation-source manager 160. This methodological implementation may be performed in software, hardware, or a combination thereof. For ease of understanding, the method is delineated as separate steps represented as independent blocks in FIG. 2; however, these separately delineated steps should not be construed as necessarily order dependent in their performance. Additionally, for discussion purposes, the method 200 is described with reference to FIG. 1.

These following actions are typically performed in response to user directions (e.g., a user-interface selection). However, these actions may be performed automatically or in response to a programmed option.

At 202 of FIG. 2, the installation-source manager 160 loads or re-loads the required installation-source components (e.g., components 152) of a software product into the installation-source cache (e.g., cache 150) without re-installing the software product. In doing so, the manager may create a new installation-source cache or utilize an existing one.

At 204, the installation-source manager 160 secures the installation-source cache so that the cache is no longer removable or modifiable without high-level authorization and/or specific exception.

At 206 of FIG. 2, the manager enables installation-source components of a particular software product in the installation-source cache (e.g., cache 160) to be the installation source for an installed application (e.g., cache 152). This is typically accomplished by modifying associated configuration data.

At 208, the manager relocates an existing installation-source cache to another storage location.

At 210, the installation-source manager 160 disables and/or removes an existing installation-source cache of one or more software products.

Enterprise Installation and Maintenance of Software Products

In a medium-to-large scale multi-user network environment (herein, an "enterprise network"), it is difficult for the net-admins to personally visit each physical computer on the network for installation and upgrade purposes. Instead, enterprise networks often utilize a network-accessible share-point for installation of software products. This way, each network-coupled computer may access the appropriate installation software on the network-accessible share-point and install a new software product or upgrade/repair an already-installed software product.

In addition to network accessibility, many net-admins of enterprise networks institute automatic installation of new software products onto the network-coupled computers. Typically, the net-admin configures a computer so that a new software product is automatically installed on that computer. The next user network login on that computer is a common trigger for that automatic installation.

Furthermore, many net-admins of enterprise networks institute automatic maintenance (e.g., reinstalling, upgrading and repairing) of already-installed software products on the network-coupled computers. Similar to the automatic installation, the net-admin configures a computer to perform automatic maintenance on an already-installed software product. Again, the next user network login on that computer is a common trigger for that automatic maintenance.

However, a network traffic jam is one of the problems frequently encountered with conventional approaches to automatic installation and automatic maintenance in enterprise networks. Hundreds or thousands of network users may trigger the automatic installation or maintenance of a software product during a short period of time (e.g., during the typical morning network-login times).

These network traffic jams are the result of multiple and numerous concurrent accesses to a common network-accessible share-point (e.g., those containing installation or maintenance data) and transmission of the installation or maintenance data across the network. Conventional approaches to automatic installation and automatic maintenance in enterprise networks typically cause traffic overloads on such networks.

Figure 3:
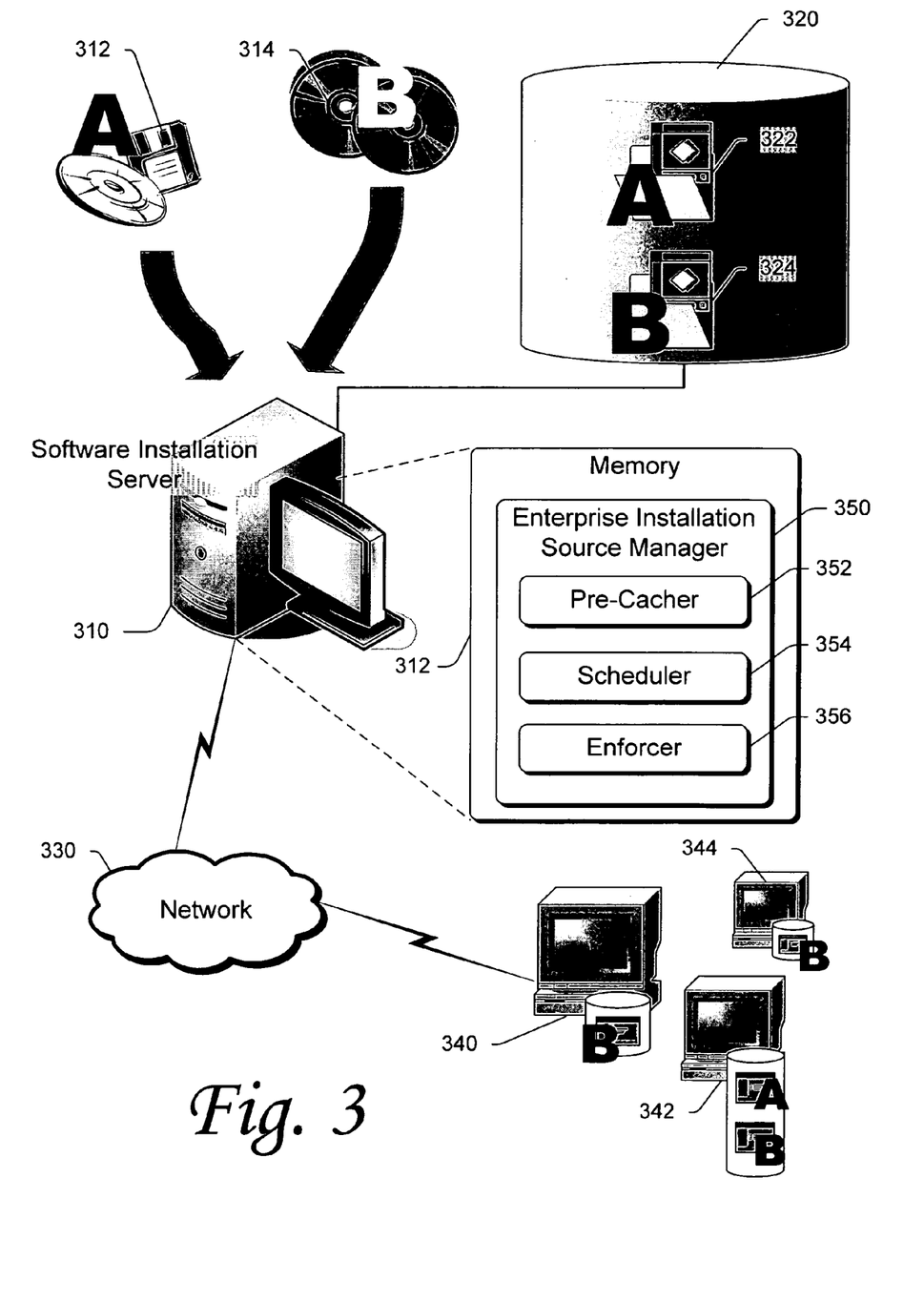
FIG. 3 shows an operational scenario in accordance with at least one implementation described herein.

FIG. 3 illustrates an implementation that solves this traffic jam problem by pre-loading an installation-source cache for a particular software product on multiple network workstations. Intelligently pre-loading the caches before actual installation lessens the traffic burden on the network. Using the pre-loaded cache, the target computers later install or maintain the product without affecting network traffic. The implementation itself is, for example, a program module executing on a computer system (such as is depicted in FIGS. 3 and 5).

FIG. 3 shows a network-coupled software installation/maintenance server 310 which includes a memory 312 and a network storage system 320. This server is used on an enterprise network for the deployment of new installations of software products and of maintenance updates of the products.

In the example depicted, assume a source 314 of software product "A" represents the product's original installation source. Further assume a source 316 of software product "B" represents updates for the product. While these products may be nearly any software product, we will assume, for this example, that source 314 is for Microsoft® Office® 2002 Professional suite of office productivity products and source 316 includes updates for Microsoft® Publisher® desktop publishing product.

As represented by the arrows in FIG. 3, the software installation/maintenance components of each of these products are loaded (e.g., copied) from their original computer-readable media source (e.g., CD-ROMs or floppy disks) onto the server 310. More specifically, the installation/maintenance bundle of each product is loaded the network storage system 320 of the server 310. More specifically still, installation-source components of software product A are loaded on the storage system at location 322 and maintenance-source components of software product B are loaded on the storage system at location 324.

For the sake of brevity, the term "installation-source components," as used herein, of an installation bundle expressly includes the maintenance-source components of a maintenance bundle. Similarly, the term "installation-source cache," as used herein, expressly includes the maintenance-source cache.

As shown in FIG. 3, the server 310 is coupled, via a computer communications network 330, to network workstations 340, 342, and 344. In this illustrated example, assume that the communications network 330 is an enterprise network serving hundreds and thousands of network-coupled computers.

Exemplary Enterprise Installation-Source Manager

As depicted in FIG. 3, an enterprise installation-source manager 350 program module executes in the memory 312 of the server 310. The enterprise installation-source manager 350 is one implementation of the exemplary installation-source manager, which is described herein. The manager may work in concert with other program modules operating on network workstations.

The enterprise installation-source manager 350 manages the automatic installation and maintenance of software products across the enterprise network. The manager includes one or more of the following functional sub-modules: a pre-cacher 352, a scheduler 354, and an enforcer 356.

Pre-cacher: The pre-cacher 352 downloads an installation-source cache for a software product (e.g., software product "B") to one or more network workstations (e.g., 340, 342, and 344). Unlike the conventional approach, the pre-cacher schedules the downloading of the data so that it lessens the impact on network traffic. As shown in FIG. 3, workstation 340 has an installation-source cache for software product B pre-loaded, workstation 342 has a cache for software products A and B pre-loaded, and workstation 344 has a cache for software product B pre-loaded.

In one implementation, the pre-cacher tracks current network traffic patterns. It schedules cache downloads during low traffic times. In another implementation, the pre-cacher monitors current traffic conditions and throttles cache downloads based upon those current traffic conditions. Of course, the pre-cacher may do both. It may track and monitor.

The pre-cacher 352 works in concert with the network workstations receiving the caches so that the caches may be downloaded without interfering with on-going operations on the workstation. The pre-caching occurs without the user of the computer being aware of it happening.

Scheduler: Once the cache is pre-loaded on a workstation, the scheduler 354 determines when the software product is installed. The scheduler may send a signal to each workstation that tells it when to install or perform maintenance. Alternatively, the scheduler may give the workstation a specified triggering event or specific time at which the workstation may initiate installation/maintenance.

Enforcer: The enforcer 356 may override the scheduler. Specifically, the enforcer may require that installation or maintenance may only be performed if the cache was successfully and fully pre-loaded. Sometimes, a cache may not pre-load because of several reasons. The most common reason is insufficient storage space on the receiving workstation. Without this enforcement, the workstation may be able to perform installation/maintenance from the sources (e.g., 322 and 324) located on the storage system 320 of the server 310. If so, that would affect the network traffic.

Methodological Implementation

Figure 4:
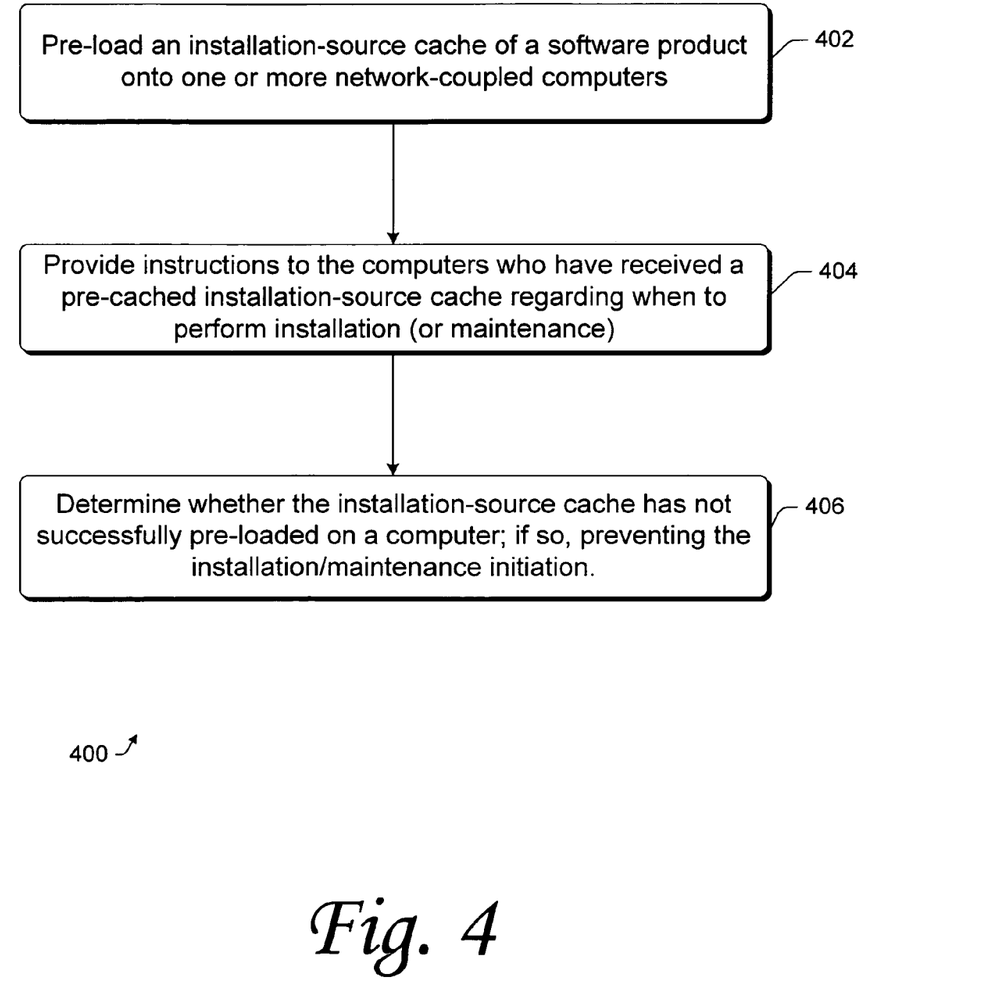
FIG. 4 illustrates a flow diagram showing a methodological implementation described herein.

FIG. 4 shows a method 400 performed by the enterprise installation-source manager 350. This methodological implementation may be performed in software, hardware, or a combination thereof. For ease of understanding, the method is delineated as separate steps represented as independent blocks in FIG. 4; however, these separately delineated steps should not be construed as necessarily order dependent in their performance. Additionally, for discussion purposes, the method 400 is described with reference to FIGS. 1 and 3.

At 402 of FIG. 4, the enterprise installation-source manager 350 pre-loads an installation-source cache (e.g., cache 150) of a software product onto one or more network-coupled computers (e.g., workstations 340, 342, and 344). This pre-loaded cache contains installation-source components of the software product.

At 404, the enterprise installation-source manager 350 directs the computers who have received a pre-cached installation-source cache regarding when to perform installation (or maintenance). Such a direction may be based upon an event trigger, a time trigger, or it may be a direct instruction to perform that task now.

At 406, the manager overrides the directions of block 404 for a particular computer if it determines that the installation-source cache has not successfully pre-loaded on that computer.

Exemplary Computing System and Environment

FIG. 5 illustrates an example of a suitable computing environment 500 within which an exemplary installation-source manager, as described herein, may be implemented (either fully or partially). The computing environment 500 may be utilized in the computer and network architectures described herein.

The exemplary computing environment 500 is only one example of a computing environment and is not intended to suggest any limitation as to the scope of use or functionality of the computer and network architectures. Neither should the computing environment 500 be interpreted as having any dependency or requirement relating to any one or combination of components illustrated in the exemplary computing environment 500.

The exemplary installation-source manager may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, personal digital assistants (PDA), appliances, special-purpose electronics (e.g., a DVD player), programmable consumer electronics, network PCs, minicomputers, mainframe computers, distributed computing environments that include any of the above systems or devices, and the like.

The exemplary installation-source manager may be described in the general context of computer-executable instructions, such as program modules, being executed by a computer. Generally, program modules include routines, programs, objects, components, data structures, etc. that perform particular tasks or implement particular abstract data types. The exemplary installation-source manager may also be practiced in distributed computing environments where tasks are performed by remote processing devices that are linked through a communications network. In a distributed computing environment, program modules may be located in both local and remote computer storage media including memory storage devices.

The computing environment 500 includes a general-purpose computing device in the form of a computer 502. The components of computer 502 may include, but are not limited to, one or more processors or processing units 504, a system memory 506, and a system bus 508 that couples various system components, including the processor 504, to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus, also known as a Mezzanine bus.

Computer 502 typically includes a variety of computer-readable media. Such media may be any available media that is accessible by computer 502 and includes both volatile and non-volatile media, removable and non-removable media.

The system memory 506 includes computer-readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 525. Alternatively, the hard disk drive 516, magnetic disk drive 518, and optical disk drive 522 may be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 516 magnetic disk 520, optical disk 524, ROM 512, and/or RAM 510, including, by way of example, an operating system 526, one or more application programs 528, other program modules 530, and program data 532.

A user may enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device may also be connected to the system bus 508 via an interface, such as a video adapter 544. In addition to the monitor 542, other output peripheral devices may include components, such as speakers (not shown) and a printer 546, which may be connected to computer 502 via the input/output interfaces 540.

Computer 502 may operate in a networked environment using logical connections to one or more remote computers, such as a remote computing device 548. By way of example, the remote computing device 548 may be a personal computer, a portable computer, a server, a router, a network computer, a peer device or other common network node, and the like. The remote computing device 548 is illustrated as a portable computer that may include many or all of the elements and features described herein, relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet. Such networking environments may be wired or wireless.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which may be internal or external to computer 502, may be connected to the system bus 508 via the input/output interfaces 540 or other appropriate mechanisms. It is to be appreciated that the illustrated network connections are exemplary and that other means of establishing communication link(s) between the computers 502 and 548 may be employed.

In a networked environment, such as that illustrated with computing environment 500, program modules depicted, relative to the computer 502 or portions thereof, may be stored in a remote memory storage device. By way of example, remote application programs 558 reside on a memory device of remote computer 548. For purposes of illustration, application programs and other executable program components, such as the operating system, are illustrated herein as discrete blocks, although it is recognized that such programs and components reside at various times in different storage components of the computing device 502, and are executed by the data processor(s) of the computer.

Computer-Executable Instructions

An implementation of an exemplary installation-source manager may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 5 illustrates an example of a suitable operating environment 500 in which an exemplary installation-source manager may be implemented. Specifically, the exemplary installation-source manager(s) described herein may be implemented (wholly or in part) by any program modules 528-530 and/or operating system 526 in FIG. 5 or a portion thereof.

The operating environment is only an example of a suitable operating environment and is not intended to suggest any limitation as to the scope or use of functionality of the exemplary installation-source manager(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipment, general and special-purpose appliances, application-specific integrated circuits (ASICs), network PCs, minicomputers, mainframe computers, distributed computing environments that include any of the above systems or devices, and the like.

Computer-Readable Media

An implementation of an exemplary installation-source manager may be stored on some form of computer-readable media. Computer-readable media may be any available media that may be accessed by a computer. By way of example, computer-readable media may comprise, but is not limited to, "computer storage media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer-readable instructions, data structures, program modules, or other data in a modulated data signal, such as carrier wave or other transport mechanism. Communication media also includes any information delivery media.

CONCLUSION

The techniques may be implemented in many ways, including (but not limited to) program modules, general and special-purpose computing systems, network servers and equipment, dedicated electronics and hardware, and as part of one or more computer networks. The techniques may, for example, be implemented on a computer system depicted in FIG. 5.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. One or more computer-readable storage media having computer-executable instructions that, when executed by a computer, perform acts comprising:
   loading installation-source components of an already-installed software product into an installation-source cache of a computer;
   enabling the loaded installation-source components in the installation-source cache, the enabling including modifying an operating system registry to cause the computer to acquire the installation-source components from the installation-source cache; and
   disabling the loaded installation-source components in the installation-source cache, the disabling including modifying an operating system registry to cause the computer to cease acquiring the installation-source components from the installation-source cache,
   wherein the loading and enabling acts are performed without re-installing the already-installed software product.

2. One or more computer-readable storage media as recited in claim 1, further comprising securing the loaded installation-source components of the software product so that the loaded installation-source components are undeletable.

3. One or more computer-readable storage media as recited in claim 1, further comprising securing the installation-source cache of the software product so that the installation-source cache is undeletable.

4. One or more computer-readable storage media as recited in claim 1, the installation-source cache being located on a local storage system of the computer, further comprising relocating the installation-source cache to another location in the local storage system and re-enabling the loaded installation-source components in the relocated installation-source cache.

5. One or more computer-readable storage media as recited in claim 1, the installation-source cache being located on a local storage device of the computer, further comprising relocating the installation-source cache to another local storage device and re-enabling the loaded installation-source components in the relocated installation-source cache.

6. One or more computer-readable storage media as recited in claim 1, wherein the computer-readable storage media is a network-accessible storage system that is accessible by one or more computers via a communications network and the computer on which the software product is already installed is configured to access the network-accessible storage system.

7. A method of installation-source management, the method comprising the acts of:
   loading installation-source components of an already-installed software product into an installation-source cache of a computer;
   enabling the loaded installation-source components in the installation-source cache, the enabling including modifying an operating system registry to cause the computer to acquire the installation-source components from the installation-source cache;
   securing the installation-source cache of the software product so that the installation-source cache is undeletable; and
   disabling the loaded installation-source components in the installation-source cache, the disabling including modifying an operating system registry to cause the computer to cease acquiring the installation-source components from the installation-source cache,
   wherein the loading and enabling acts are performed without re-installing the already-installed software product, and wherein the enabling is to facilitate maintenance of the already-installed product.

8. A method as recited in claim 7, the installation-source cache being located on a local storage system of the computer, further comprising relocating the installation-source cache to another location in the local storage system and re-enabling the loaded installation-source components in the relocated installation-source cache.

9. A method as recited in claim 7, the installation-source cache being located on a local storage device of the computer, the method further comprising relocating the installation-source cache to another local storage device.

10. One or more computer-readable storage media having computer-executable instructions thereon that, when executed by a computer, perform acts comprising:
    re-locating installation-source components of an already-installed software product onto a computer into an installation-source cache on a local storage system of the computer;
    enabling the re-located installation-source components in the installation-source cache, the enabling including modifying an operating system registry to cause the computer to acquire the installation-source components from the installation-source cache; and
    disabling the loaded installation-source components in the installation-source cache, the disabling including modifying an operating system registry to cause the computer to cease acquiring the installation-source components from the installation-source cache,
    wherein the re-locating and enabling acts are performed without re-installing the already-installed software product.

11. One or more computer-readable storage media as recited in claim 10, further comprising securing the installation-source cache of the software product so that the installation-source cache is undeletable.

* * * * *